(12) United States Patent
Rey-Mermet

(10) Patent No.: US 7,420,648 B2
(45) Date of Patent: Sep. 2, 2008

(54) METHOD FOR PRODUCING A DEVICE DEFINING A VOLUME FOR RETAINING A FLUID OR A SENSITIVE MATERIAL

(75) Inventor: Gilles Rey-Mermet, Le Landeron (CH)

(73) Assignee: Asutlab S.A., Marin (CH)

( * ) Notice: Subject to any disclaimer, the term of this patent is extended or adjusted under 35 U.S.C. 154(b) by 429 days.

(21) Appl. No.: 10/518,500

(22) PCT Filed: Jun. 10, 2003

(86) PCT No.: PCT/EP03/06024

§ 371 (c)(1), (2), (4) Date: Dec. 20, 2004

(87) PCT Pub. No.: WO04/001493

PCT Pub. Date: Dec. 31, 2003

(65) Prior Publication Data

US 2005/0174527 A1  Aug. 11, 2005

(30) Foreign Application Priority Data

Jun. 21, 2002  (EP) .................................. 02077493

(51) Int. Cl.
*G20F 1/1339* (2006.01)

(52) U.S. Cl. .................. 349/190; 349/155; 349/156

(58) Field of Classification Search ........................ None
See application file for complete search history.

(56) References Cited

U.S. PATENT DOCUMENTS 5,089,905 A * 2/1992 Sasaki et al. .................. 349/97

(Continued)

FOREIGN PATENT DOCUMENTS

EP   0526 232 A   2/1993

(Continued)

OTHER PUBLICATIONS

International Search Report, completed Sep. 16, 2003.

*Primary Examiner*—David C. Nelms
*Assistant Examiner*—Lucy P Chien
(74) *Attorney, Agent, or Firm*—Griffin & Szipl, P.C.

(57) ABSTRACT

The present invention concerns a method of manufacturing at least one device (2, 30, 48) defining a volume (8) for retaining a fluid or a sensitive material that is capable of changing its physical properties, particularly its optical properties, via the application of a voltage, or its electrical properties via stress or radiation, said device (2, 30, 48) including at least a first front substrate (4, 38, 56) and at least a second back substrate (6, 32, 50) maintained at a constant distance from each other, these two substrates (6, 32, 50; 4, 38, 56) being joined by a sealing joint (24, 46, 72) which defines the volume (8) for retaining the sensitive medium or fluid, said method being characterised in that it includes the steps of:

Figure 1:
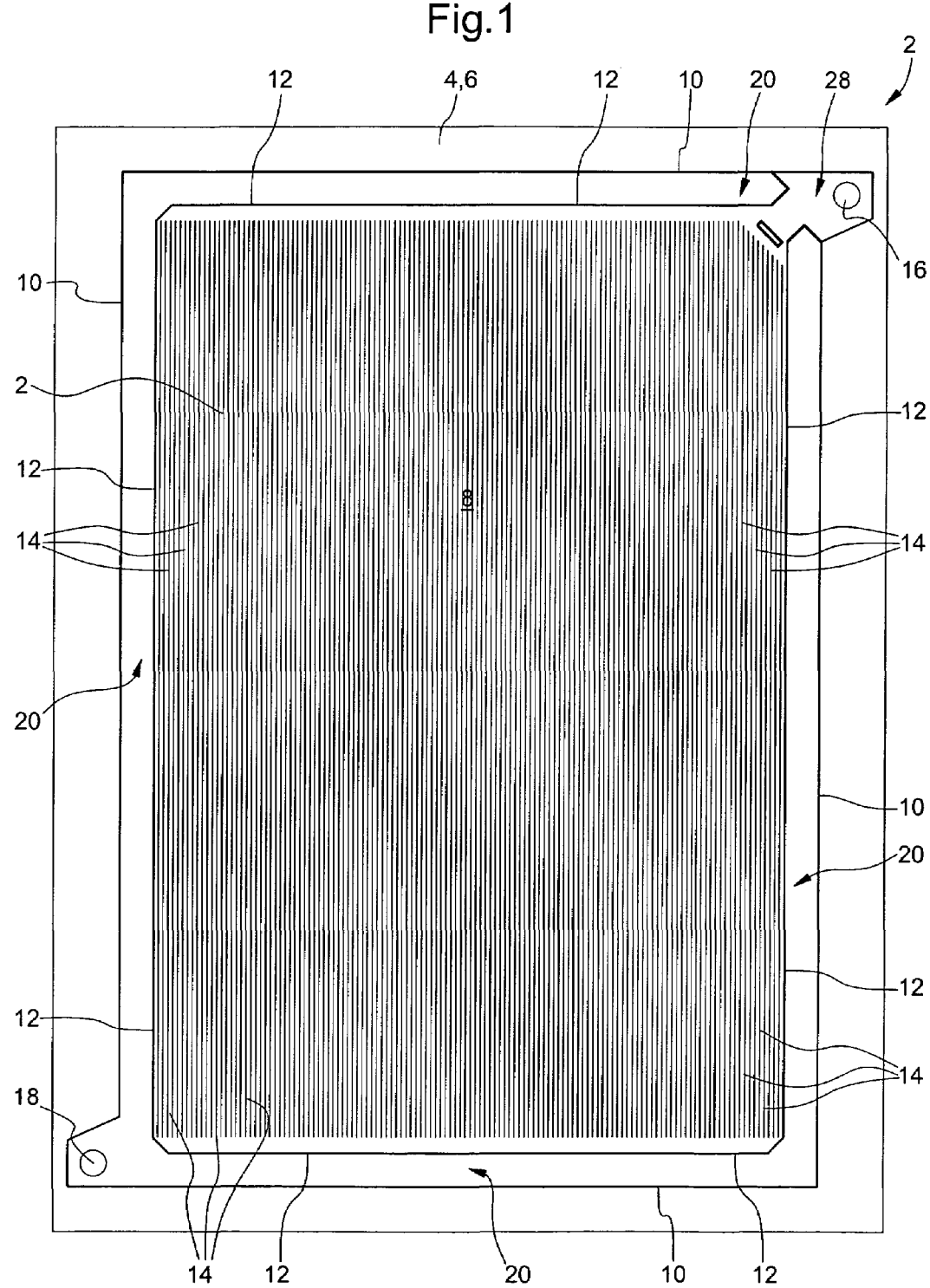

structuring at least one wall (12, 44, 66), which defines via its inner lateral face the volume (8) for retaining the sensitive medium or fluid, on one of the substrates (6, 32, 50);

joining the second substrate (4, 38, 56) to the first substrate (6, 32, 50);

introducing a sealing material capable of flowing into the gap (22) defined by the outer lateral face of the wall (12, 44, 66) and the two superposed substrates (6, 32, 50; 4, 38, 56) until at least a part of the volume of said gap (22) is occupied by the sealing material, and solidifying the sealing material so that the latter forms the sealing frame (26, 46, 72).

13 Claims, 7 Drawing Sheets

U.S. PATENT DOCUMENTS

| | | | |
|---|---|---|---|
| 5,724,110 A | * 3/1998 | Majima | 349/86 |
| 2001/0043307 A1 | * 11/2001 | Furukawa et al. | 349/190 |
| 2002/0063839 A1 | * 5/2002 | Matsumoto | 349/156 |

FOREIGN PATENT DOCUMENTS

| | | |
|---|---|---|
| JP | 04 180027 A | 6/1992 |
| JP | 06 222317 A | 8/1994 |
| JP | 07 175072 A | 7/1995 |
| JP | 2001 324720 A | 11/2001 |
| WO | WO 00 45360 A | 8/2000 |
| WO | WO 02 073302 A | 9/2002 |

* cited by examiner

METHOD FOR PRODUCING A DEVICE DEFINING A VOLUME FOR RETAINING A FLUID OR A SENSITIVE MATERIAL

This is a National Phase Application in the United States of International Patent Application No. PCT/EP03/06024 filed Jun. 10, 2003, which claims priority on European Patent Application No. 02077493.1, filed Jun. 21, 2002. The entire disclosures of the above patent applications are hereby incorporated by reference.

The present invention concerns a method for producing a device such as electro-optical display cells or electrochemical photovoltaic cells. The present invention also concerns certain types of micro-systems better know as "Micro Electro Mechanical Systems" or "MEMS".

A first known category of photovoltaic cells converts light into electricity by exploiting the photovoltaic effect that appears at the junction of semi-conductor materials. The semi-conductor material fulfils both the function of light absorption and of separation of the resulting electrical charges (electrons and holes). The material has to be of great purity, free of any defects, otherwise electrons and holes recombine before being able to be separated.

The present invention concerns a second type of photovoltaic cells called electrochemical cells, which include a semi-conductor material that is normally insensitive to visible light because of its forbidden bandwidth, and that only starts to absorb in the near ultraviolet. Such a material can nonetheless be sensitized by adsorption of a colouring agent such as a transition metal complex which allows a conversion rate between an incident photon and an electron close to one. After having been excited by the absorption of a photon, the colouring agent can transfer an electron into the conduction band of a semi-conductor material. The electric field prevailing at the core of the semi-conductor material enables the electron to be extracted. After transferring the electron, the colouring agent returns to the fundamental oxidized state. Recombination between the electron in the semi-conductor material conduction band and the hole on the oxidized colouring agent is much slower than the reduction of the oxidized colouring agent by a mediator. Consequently, the charge separation is efficient.

The cells of the type described hereinbefore generally include a first transparent front substrate and a second back substrate, which generally can either be transparent or not. These two substrates each include on their faces that are opposite each other a first electrode also called the counter-electrode, and a second electrode usually called known as the photo-electrode. These electrodes are to be connected to an electrical supply circuit and are conventionally made in the form of a thin layer of a transparent conductive oxide such as a mixture of indium/tin oxide or antimony/tin oxide.

The two substrates are joined to each other by a sealing frame, which extends along the periphery of the latter. This sealing frame defines a sealed volume for retaining the semi-conductor material deposited in layers on one of the substrates and an electrolyte containing the aforementioned mediator.

The present invention also concerns so-called electro-optical cells, in particular liquid crystal cells, which, like electrochemical photovoltaic cells, include:

a first transparent front substrate whose top surface forms the front face of the cell;

a second back substrate which can also be transparent or not transparent, whose bottom surface forms the back face of said cell;

the substrates each including on their faces that are opposite each other at least one electrode, these electrodes being intended to be connected to a display control circuit, which, by applying appropriate electrical voltages to selected electrodes, is able to alter the transmission or reflection features of an optically active medium;

the substrates being joined by a sealing frame defining a sealed volume for retaining an optically active medium, and connection means for setting up the electrical connection between each electrode and the display control circuit.

The sealing frame assures the hermeticity of the edges of the cell, thereby efficiently retaining the active medium contained by the cells, and protecting this medium from gas diffusion phenomenon from the surrounding atmosphere which could compromise the perenity of the cells.

Usually, deposition of the sealing frame is carried out by screen printing, a method whose implementation can irremediably damage all of the fragile structures such as the electrical connections or spacers which have already been deposited when the screen printing step occurs. In fact, the screen printing technique, which consists, let us recall, in depositing a material of paste-like consistency through the unobstructed mesh of a screen, for example made of nylon or stainless steel, with a very fine mesh using a squeegee that is actuated by hand or mechanically, is a technique whose implementation generates not insignificant mechanical stress which is often harmful to the already deposited neighbouring structures, such as the alignment layers, the spacing bars or the electrical connections.

As is known, the spacers are supposed to maintain a constant space between the two substrates of the cells and give the latter satisfactory mechanical rigidity. In known methods to date, the distance between the two substrates is generally maintained by balls or discontinued fibres of perfectly controlled geometrical dimensions, spread over one of the substrates before the second substrate is set in place. This initial technique has certain drawbacks, such as, in particular, a high price and random positioning of the balls that can form optical diffusion centres, at the core of the pixels of a matrix display, adversely affecting the appearance of the display. It has thus been proposed to replace such balls with continuous spacers obtained by depositing a layer of photoresist material of the desired thickness over one of the substrates, this layer then being structured to give it the shape of the desired spacers. This latter technique is the only one capable of guaranteeing the mechanical rigidity necessary for certain types of liquid crystals. It further prevents the aforementioned phenomenon of optical diffusion, which damage the appearance of the spacers insofar as the spacers can be deposited selectively at locations chosen in advance, particularly outside the pixels. Finally, spacers structured by photolithography can have an adhesive power enabling the two substrates to be assembled to each other.

As will have been understood from the foregoing, the spacers play a particularly decisive part in the proper working of the cells with an optically or electro-optically active medium with which the present invention is concerned. Unfortunately, these spacers, when they are made of photoresist, can be irremediably damaged during screen printing deposition of the sealing frame.

Another drawback which weighs on the screen printing deposition techniques for sealing frames lies in the fact that it is difficult to control with precision the final dimensions of the frames. In fact, when the top substrate is applied onto the bottom substrate, the sealing material is compressed and tends to spread out via the effect of the pressure exerted, such that the width of the sealing frame can only be controlled with a precision typically of the order of a tenth of a millimetre. Moreover, the inner barrier of sealing frames deposited by screen printing, which is in contact with the liquid crystal, usually has irregularities in shape, such that these frames have to be arranged at a sufficient distance from the electrodes to prevent them from overlapping therewith. Such a situation may be acceptable if there is a large enough space between the edges of the cell from where the connections emerge and the actual active zone of the cell. However, as soon as one tries to reduce the dimensions of the dead zone reserved for the connector technology, in order to optimise the surface of the display zone of the cell or to answer problems of bulkiness, the precision offered by screen printing techniques is no longer sufficient.

The present invention concerns, finally, microsystems of the fluidic type such as pressure sensors, micropumps or even micro-mixers for channelling the flow of liquids in a controlled manner. These micro-structures have, in fact, a large number of analogies with liquid crystal display cells and electrochemical photovoltaic cells. They include, in particular, two substrates separated from each other by a constant distance and between which channels are arranged. These channels, inside which the liquid or gaseous fluids flow, are conventionally etched in the volume of said substrates. During assembly of the substrates, which may occur, for example, by anodic welding, the nature of the materials used to make said substrates often imposes large constraints, in particular in terms of the welding temperature and the electric voltages applied. These constraints can be harmful to the structures already deposited on the substrates prior to welding.

It is an object of the present invention to overcome the aforementioned problems in addition to others still, by providing a manufacturing method, particularly for a liquid crystal display cell, which is easy to implement and which limits especially the risk of damaging elements already deposited in the cell.

The present invention also concerns a device with an optically or chemically active medium for implementing the method according to the invention.

Thus, according to its first aspect, the present invention concerns a method of manufacturing at least one device defining a volume for retaining a fluid or a sensitive material capable of changing physical properties, particularly optical properties, via application of a voltage, or electrical properties via stress or radiation, this device including at least a first front substrate and at least a second back substrate held at a constant distance from each other, these two substrates being joined by a sealing joint, which defines the volume for retaining the sensitive medium or fluid, this method being characterised in that it includes the steps of:
  structuring at least one wall, which defines via its inner lateral face the volume for retaining the sensitive medium or fluid, on one of the substrates;
  joining the second substrate to the first substrate;
  introducing a sealing material capable of flowing into the gap defined by the external lateral face of the wall and the two superposed substrates until at least a part of the volume of said gap is occupied by the sealing material; and
  solidifying the sealing material so that the latter forms the sealing joint.

Owing to these features, the present invention provides a method of manufacturing devices such as, particularly, liquid crystal display devices, which enables previously deposited fragile structures such as connection elements, to be embedded in the sealing material, thus greatly limiting the risk of damaging such structures. Such a result would also be difficult to obtain by screen printing without any risk of ending up with an excess thickness, locally, which would inevitably lead to imprecise spacing between the two substrates during the subsequent assembly thereof.

According to a first implementation variant of the method of the invention, a layer of photoresist material is deposited on one of the substrates, said photoresist material will then be structured by photo-etching techniques in order to give it the shape of one or several walls.

The present invention thus relies upon simple techniques commonly used in the field of manufacturing cells, such as liquid crystal display cells. These techniques are thus perfectly mastered. In particular, the method according to the invention enables the width of the sealing frames to be controlled with great accuracy as well as the positioning of the internal barrier of said frames that is in contact with the liquid crystal, which is not the case of screen printing type methods. Moreover, the photolithographic techniques on which the invention relies do not generate any mechanical stress when implemented, which is very favourable for the cell elements that have already been deposited and which are no longer likely to be damaged or worn out during manufacture.

According to a second implementation of the method of the invention, the wall or walls are structured by screen printing.

In fact, if the wall does not need to be made with great precision, for example when there is sufficient space available for making the connection zones of a liquid crystal cell, a screen printing type method can nonetheless be used.

According to yet another implementation variant of the method of the invention, the walls are formed using a photoresist material dispenser of the syringe type.

According to another feature of the invention, the photoresist layer is structured so as to form, not only the wall or walls, but also spacers for maintaining a constant space between the two substrates of the cell.

Owing to this other feature, the present invention enables the spacers and barriers to be structured in a single manufacturing step, which allows not insignificant savings in time and thus money to be made. Above all, the spacers are no longer likely to be damaged during a subsequent step for manufacturing the sealing frame, as was the case in the prior art. Further, the spacers and the barriers are made using the same material, which contributes yet further to simplifying the present method.

According to its second aspect, the present invention concerns a method of manufacturing a device of the type described hereinbefore, characterised in that it includes the steps of:
  structuring, on one of the substrates, at least one filling channel defined by two walls, which extend at a distance from each other;
  joining the second substrate to the first substrate;
  introducing a sealing material capable of flowing into the filling channel until the entire volume of said filling channel is occupied, and
  solidifying the sealing material so that the latter forms the sealing joint.

Finally, the present invention also concerns a device defining a volume for retaining a fluid or a sensitive material capable of changing its physical properties, particularly its optical properties, via the application of a voltage, or its electrical properties via stress or radiation, this device including at least a first front substrate and at least a second back substrate maintained at a constant distance from each other, these two substrates being joined by a sealing joint that defines the volume for retaining a sensitive medium or fluid, this device being characterised in that it includes a filling channel defined by two walls, which extend at a distance from each other over the substrate on which the walls are formed, at least one hole communicating with the filling channel being pierced in one of the substrates.

Owing to this feature, it is possible to fill the filling channels, not through the side, for example with liquid crystal cells, but through the top of the latter. One can thus work with a whole batch of such cells, without being obliged to divide the batch into strips in order to have access to the filling holes which are usually arranged on the sides of the cells. The cells can thus be practically finished in batches prior to cutting. In particular, filling and sealing the sealing feed holes with the sealing material for forming the cell sealing frames can be carried out over the whole batch, thus in a simpler and more economical manner than over individual cells.

Figure 2:
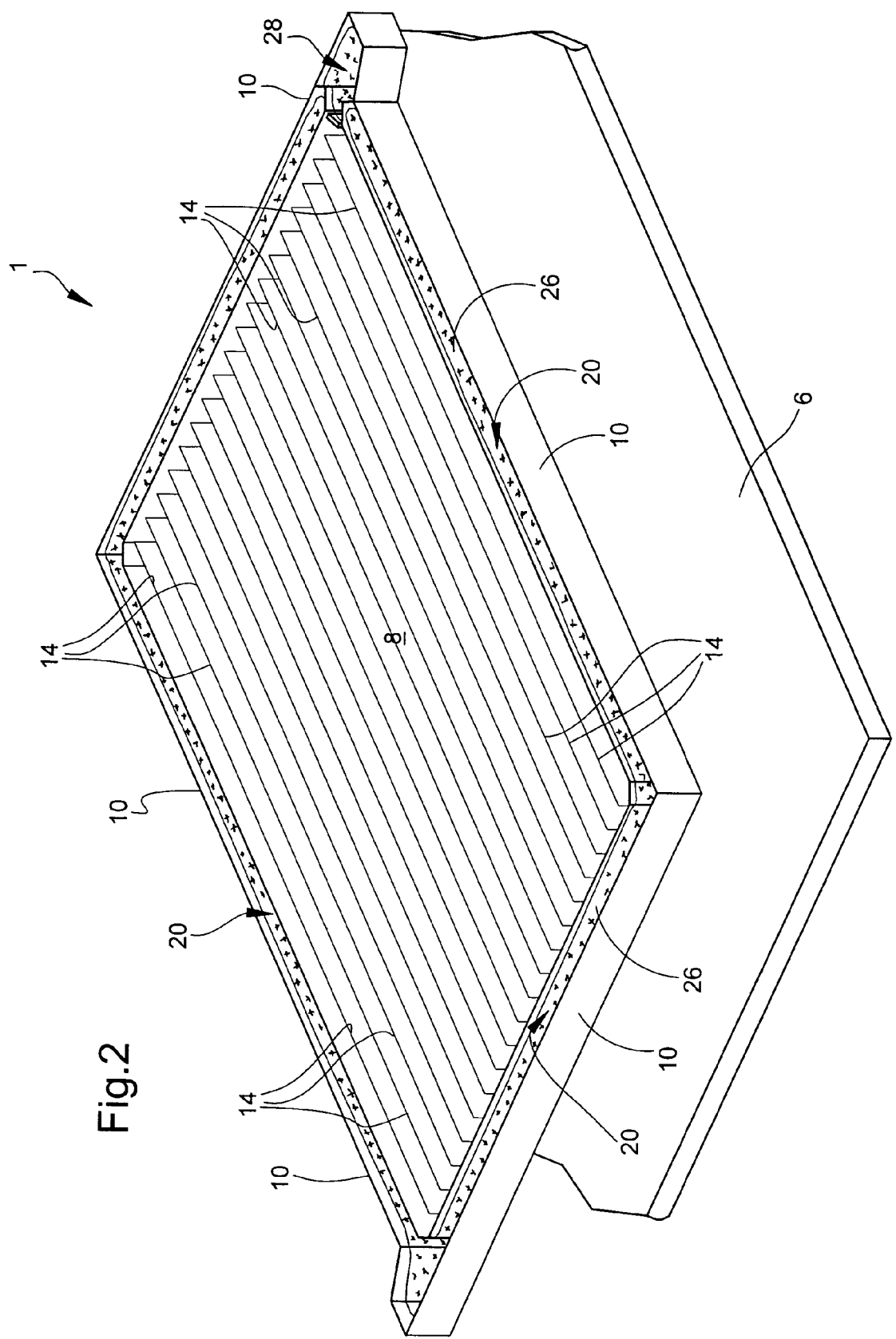
Figure 3:
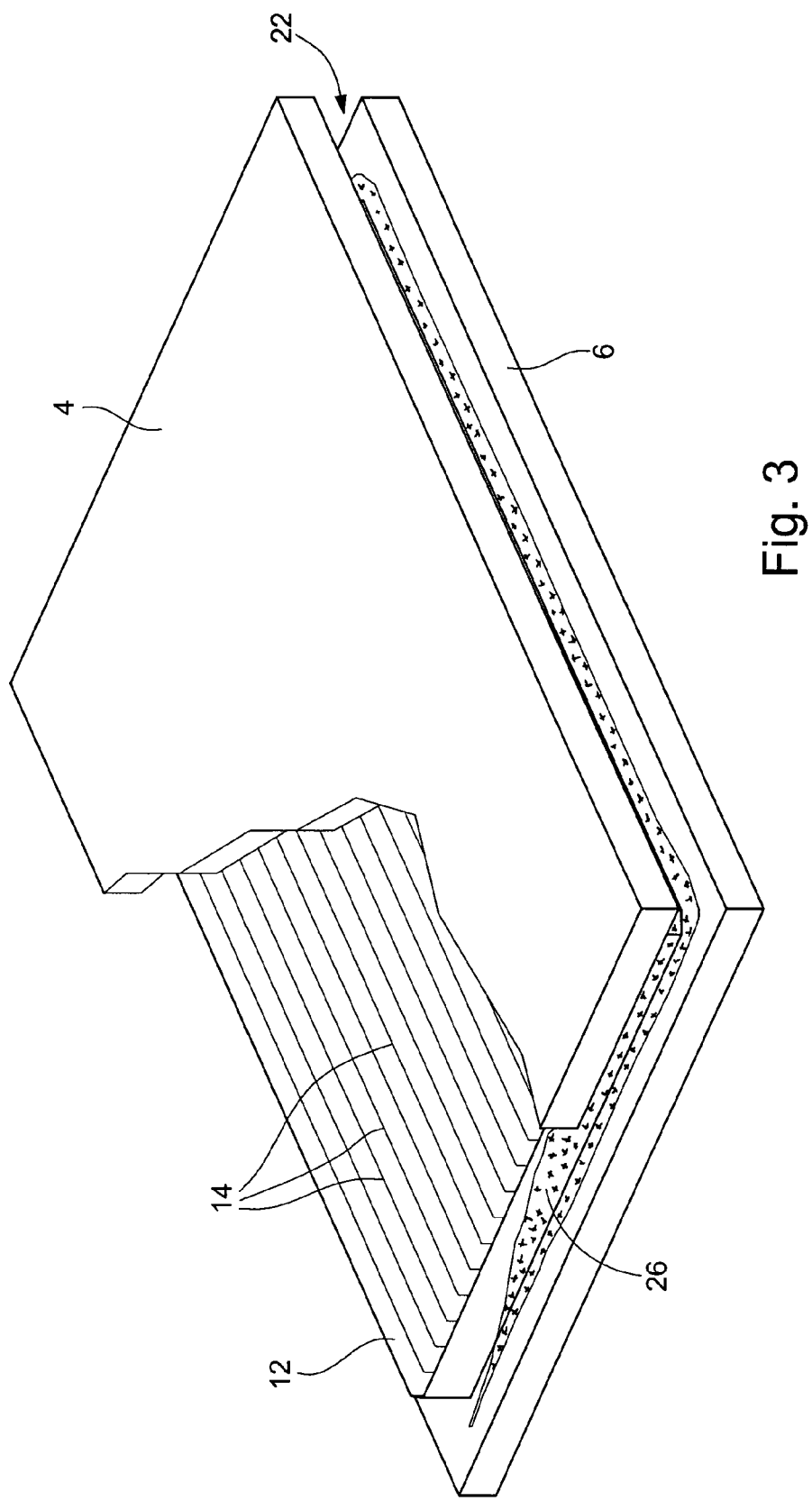
Figure 4:
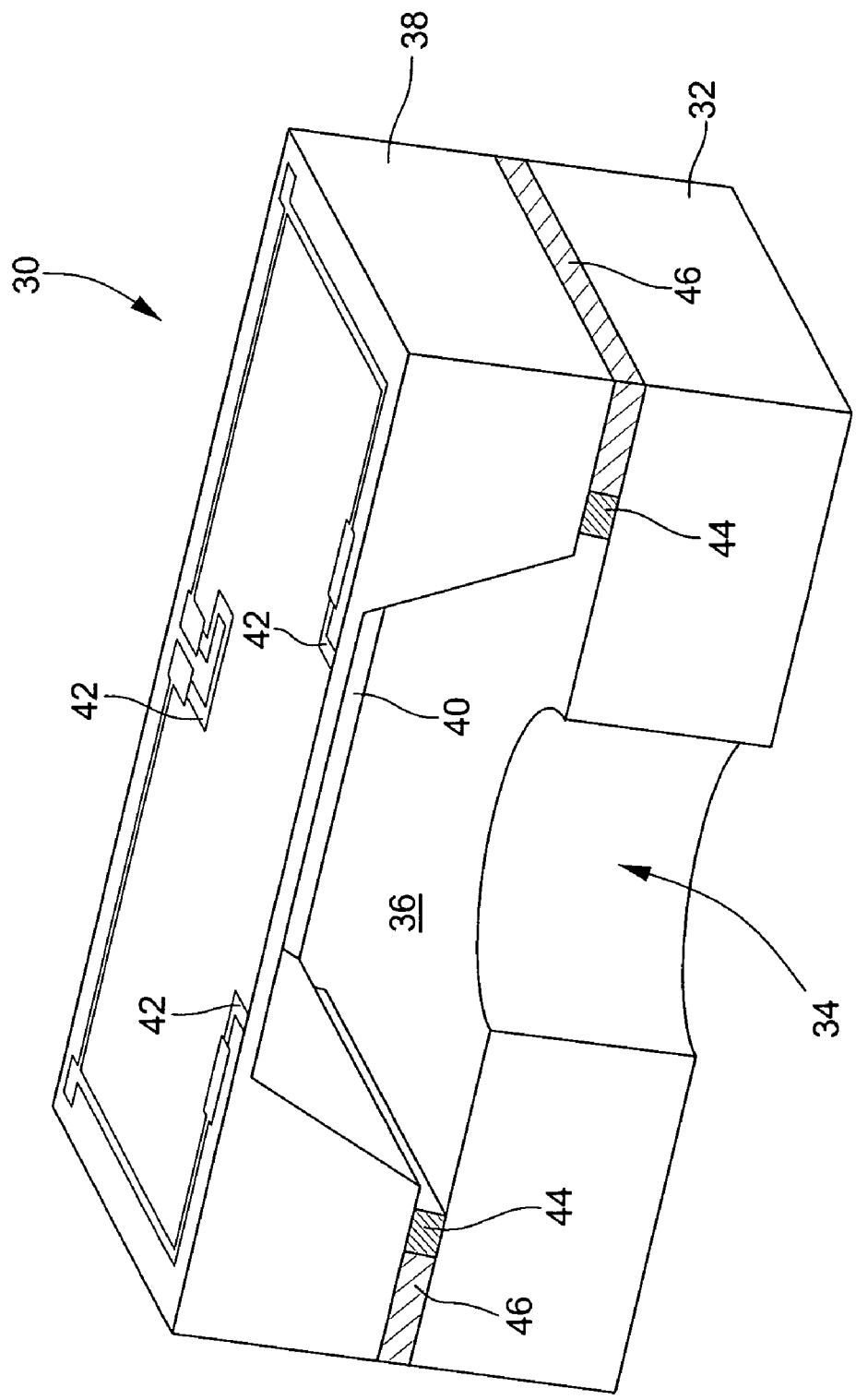
Figure 5:
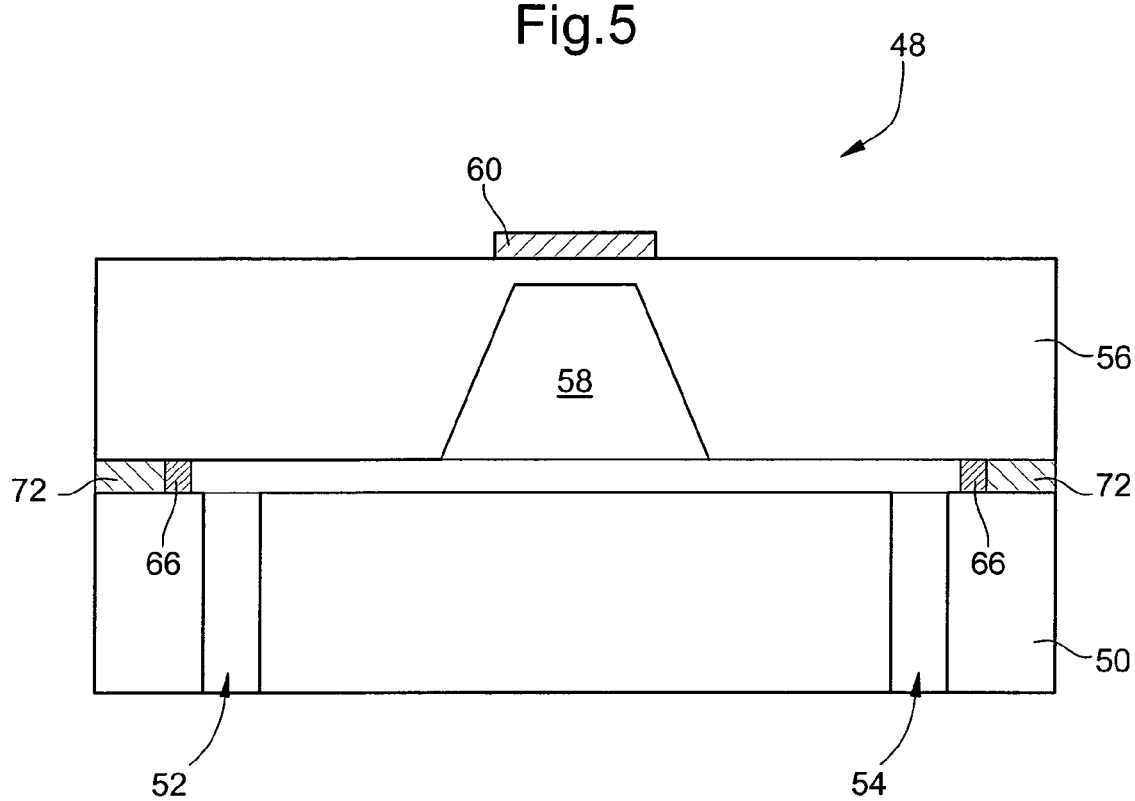
Figure 6:
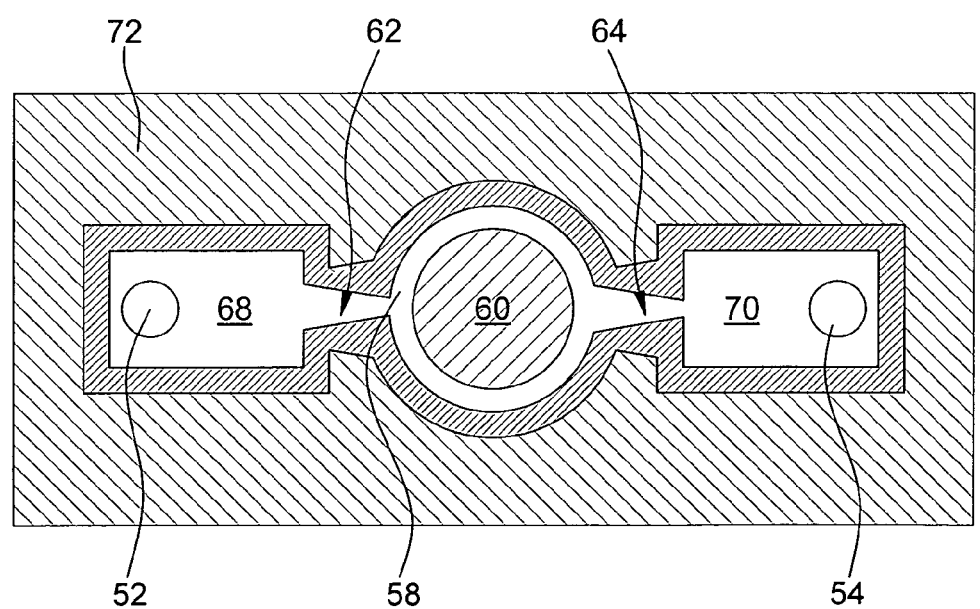
Figure 7:
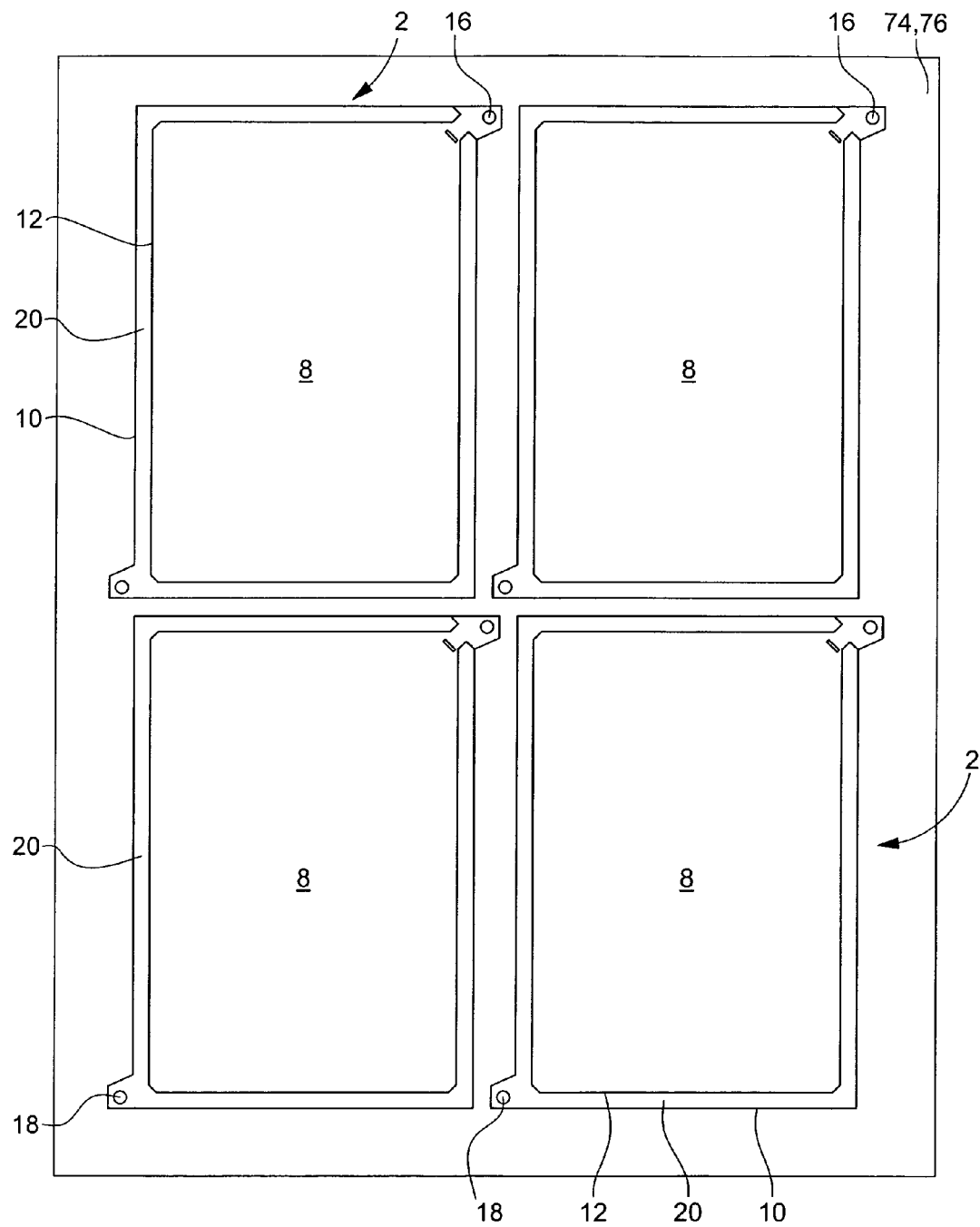
Figure 8:
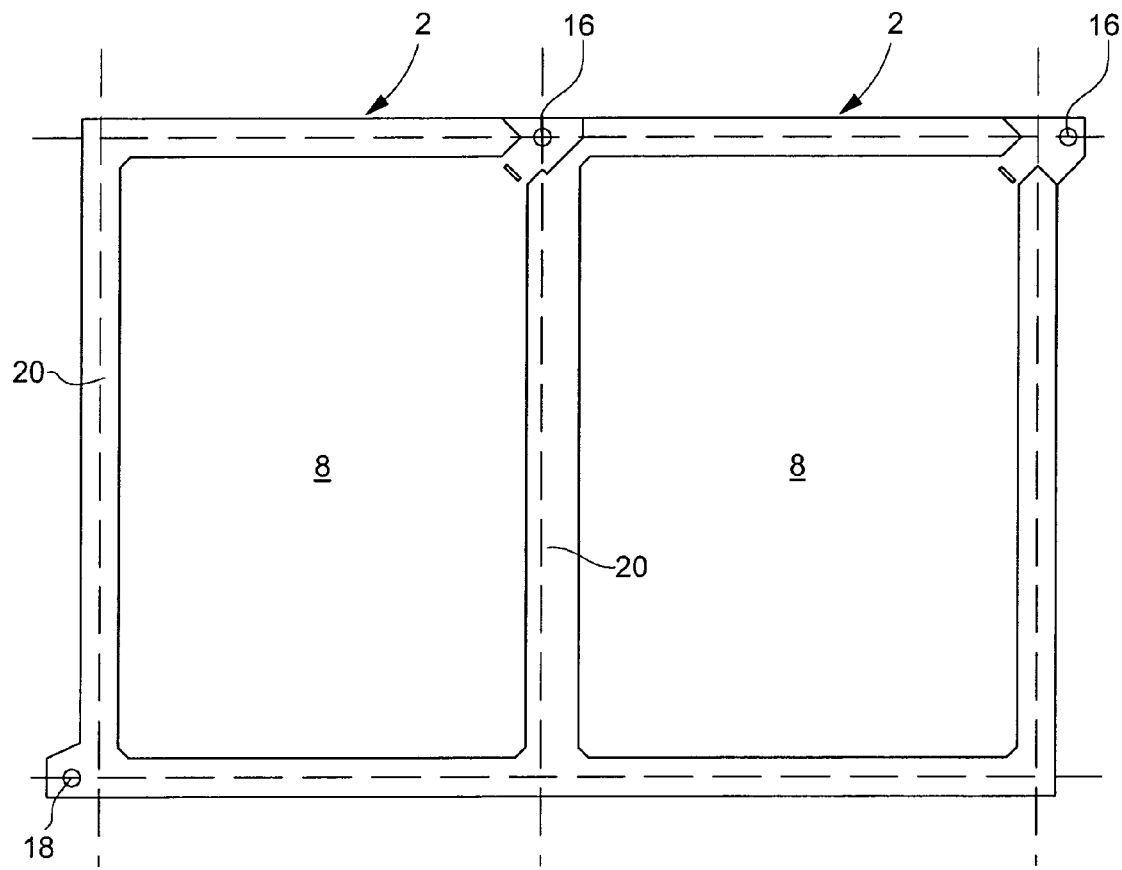

Other features and advantages of the present invention will appear more clearly upon reading the following detailed description of an example implementation of the method according to the invention, this example being given solely by way of non-limiting illustration, in conjunction with the annexed drawing, in which:

FIG. 1 is a top view of a cell in which there is shown the filling channel for receiving a fluid sealing material to form the sealing frame of said cell and the corresponding sealing material feed hole, FIG. 2 is a perspective view of the cell shown in FIG. 1, the top glass substrate having been omitted for the sake of clarity, FIG. 3 is a perspective partially torn away view of the top substrate showing the volume defined by the two superposed substrates and the external face of a wall made in accordance with the method according to the invention, FIG. 4 is a schematic diagram of a piezoresistive pressure sensor type fluidic micro-system, FIG. 5 is a longitudinal cross-section of a micro-pump type fluidic micro-system, FIG. 6 is a top view of the micro-pump shown in FIG. 5, FIG. 7 is a top view of a batch of liquid crystal cells, and FIG. 8 is a partial view of a batch of cells, two of which share a side of a filling channel.

The present invention proceeds from the general inventive idea that consists in proposing a new method of manufacturing sealing frames which conventionally join the bottom and top substrates of display cells, particularly liquid crystal cells, or electrochemical photovoltaic cells. In accordance with this new method, the technique of depositing sealing frames by screen printing, which usually occurs at an advanced cell manufacturing stage and which generates mechanical stresses which can be detrimental to the already deposited neighbouring cell structures, is replaced by a photolithographic technique, which does not generate any particular stress and which, in particular, enables the spacers and filling channels for receiving a fluid sealing material, which, after solidifying, will form the desired sealing frames, to be structured at the same time. The present invention also offers a new technique for assembling and sealing the substrates of a fluidic type micro-system.

The present invention will be described in conjunction with a liquid crystal display cell. It goes without saying that the invention is not limited to this type of cell and that it can also apply to any type of display cell including an optically active medium as well as to electrochemical photovoltaic cells of the type described in the introductory part of the present Patent Application. Likewise, the present invention applies to fluidic type micro-systems.

FIG. 1 is a plan view of a liquid crystal cell 2 during manufacture, this cell being formed by an assembly of two superposed substrates 4 and 6, for example glass substrates, whose front substrate 4 is transparent, whereas the back substrate 6 may also be transparent, or not transparent.

It can be seen in FIG. 1 that cell 2 defines a cavity 8 for containing liquid crystals, this cavity 8 being defined by substrates 4 and 6 and by sealed walls 10 and 12 for receiving a sealing material, which fixes said substrates 4 and 6 to each other as will be described in detail hereinafter. Cavity 8 also contains a multiplicity of structures or spacing bars 14 for maintaining a constant distance between substrates 4 and 6 over the entire range of cell 2 and for giving the latter suitable mechanical rigidity. Finally, a hole 16 for filing cavity 8 with liquid crystal, and at least one hole 18 for supplying the sealing material are made in front substrate 4.

In the example shown in FIG. 1, it can be seen that sealed wall 10 follows an external contour between the two superposed glass substrates 4 and 6, whereas wall 12 follows the inner contour of liquid crystal cell 2, such that outer wall 10 surrounds inner wall 12. Thus, of these walls 10 and 12 which take the form of substantially vertically barriers extending parallel to each other, one, 10, is in direct contact with the external atmosphere, and the other, 12, is in direct contact with the liquid crystal. They advantageously form a filling channel 20, which can be seen in FIG. 1 and better still in FIG. 2. This channel 20 is to be filled with a sealing material to form the sealing frame of cell 2 and will prove particularly advantageous during large-scale manufacture of cells according to the present invention.

It will, of course, be understood that wall 10 can be omitted, only wall 12, which is in contact with the liquid crystal, being kept. In such case, after said wall 12 has been structured and top substrate has been positioned on bottom substrate 6, the sealing material will be introduced into gap 22 defined by the outer lateral face of wall 12 and the two superposed substrates 4 and 6 until at least part of the volume of said gap 22 is occupied by said sealing material as shown in FIG. 3.

This operation can be accomplished using a sealing material dispenser. The dispenser will be moved along at least a part of the periphery of the two substrates 4 and 6, so as to form a cord of sealing material 26, which, by abutting against the external lateral face of wall 12 and joining said two substrates 4 and 6, will form the sealing frame. It is not necessary for the sealing frame 26 to extend as far as the edges of the two substrates 4 and 6. It only needs to be sufficiently wide to play the part of a sealing frame, i.e. to isolate the sensitive material from the external environment, to prevent the latter from leaking outside the cell and to keep the two substrates 4 and 6 together.

In order to deposit the cord of sealing material 26, one can also dip one of the edges of cell 2 defined by the two superposed substrates 4 and 6 into a receptacle containing a certain quantity of the sealing material. By capillary action, the sealing material will gradually fill the vacant volume 22 located outside the perimeter of wall 12. Another possibility consists in injecting the sealing material between the two substrates 4 and 6 via a filling hole pierced in one of said substrates 4 or 6 outside the perimeter of wall 12.

According to the invention, after having deposited all of the structures necessary for the proper operation of forthcoming cell 2 on the inner face of one of the two substrates 4 or 6, such as for example the electrodes or an alignment layer, the substrate is covered with a layer of photoresist material. This photoresist layer is then structured by conventional photo-etching techniques to give it the form of the aforementioned filling channel 20 defined by walls 10 and 12. Once filling channel 20 has been obtained, the remaining substrate, also suitably primed, is joined to the first substrate. According to a variant, one could also envisage structuring wall 10 on one of substrates 4 or 6 and wall 12 on the other substrate.

According to a variant of the method, the photoresist layer is structured so as to form not only filling channel 20, but also spacers 14 for maintaining a constant distance between the two substrates 4 and 6. Owing to the present invention, it is thus possible to structure the spacing structures and the filling channel in a single manufacturing step. In addition to the savings in time and money achieved by such a method, another advantage of this implementation variant of the method according to the invention lies in the fact that, since the spacers and the sealing frame are made in a concomitant manner, said spacers are no longer liable to be damaged during a subsequent step for manufacturing the sealing frame as was the case in the prior art. Finally, the filling channel and the spacers are made using the same material, which simplifies the present method still further.

The photolithographic techniques used within the scope of the present invention are of a conventional type and are well known to those skilled in the art. They consist, essentially, in sensitizing the photoresist layer by means of a light passing through the transparent zones of a mask reproducing the shapes of the zones to be sensitized. As regards the photoresist material, this is also, in a very conventional manner, a photosensitive resin that those skilled in the art will be able to choose without any difficulty, and whose usual purpose is to protect the surface of the layer to be etched from the action of a chemical reactant at the locations where the resin subsists after sensitization by the optical radiation and chemical removal of the zones covering the places to be etched. One can cite the photosensitive cycloten from Dow Chemical and the product marketed under the reference SU8 by Micro-Chem Corp. as materials well suited for making walls 10 and 12.

Of course, if the sealing frame positioning requirements are less strict, the latter could be structured by screen printing or using a dispenser of the syringe type and, more generally, using any selective printing technique such as flexography or ink jet printing which those skilled in the art could select without any difficulty.

As was stated hereinbefore, after sealed walls 10 and 12 defining filling channel 20 and, where appropriate spacers 14, have been structured, the two substrates 4 and 6 are joined. Said channel 20 can then be filled. In order to do this, a vacuum starts to be made in the working enclosed space in which cell 2 is made. Once the vacuum is established, a drop of sealing material is deposited above hole 18 which communicates with filling channel 20. By capillary action, the sealing material starts to flow into channel 20. Then the atmospheric pressure is re-established in the working enclosed space. Via the pressure difference between the filling channel in which quite a high vacuum prevails and the atmospheric pressure, the sealing material is driven to the bottom of the filling channel. It will be noted that, since filling channel 20 can be of a longer length depending upon the geometry of cell 2, it could be separated into two or several channels isolated from each other by a wall and each filled from a corresponding filling hole 18, so as to shorten the path that the sealing material has to travel to reach the bottom of the channel. Of course, according to a variant, one could also make at least one filling hole in external wall 10.

Typically, the material used for sealing cell 2 is a photosensitive resin which is introduced in the liquid state into filling channel 20 and which is then polymerized by sensitization using an ultraviolet light through top substrate 4. The sealing material has to hermetically seal the edges of cell 2 in order to efficiently retain the liquid crystal and protect it from gas diffusion phenomena from the ambient atmosphere. The sealing material must also have an adhesive power in order to enable it to hold the two substrates 4 and 6 together. By way of variant, the sealing material can also be formed by a resin which will polymerize via a rise in temperature in the working enclosed space. A dual component adhesive whose components harden over time or via a rise in temperature when they are put in each other's presence can also be used as sealing material. The products Loctite 3492 and Norland Optical Adhesives 61 can be cited as materials well suited for making the sealing frame. The cyanoacrylate adhesives form another family of adhesives well suited to the requirements of the present invention. Finally thermoplastic resins can also be used within the scope of the invention.

Once the sealing material has been introduced into filling channel 20 and then solidified, the liquid crystal can be introduced into cell 2 via filling hole 16. Advantageously, the introduction of the sealing material, its polymerization, then the step of introducing the liquid crystal can be carried out one after the other or simultaneously in the same machine. Finally, liquid crystal filling hole 16 is blocked as well as space 28 in immediate proximity to filling hole 16, in order to achieve sealing continuity with the closest parts of wall 12 so that the whole of the periphery of cell 2 is perfectly sealed. Finally, additional layers such as polarizers can also be deposited on substrates 4 and 6.

The present invention also applies to micro-systems or MEMS such as the piezoresistive pressure sensor shown in cross-section in FIG. 4. Designated as a whole by the reference numeral 30, this sensor is made up of a bottom substrate 32 in which there is arranged a feed pipe for a fluid whose pressure has to be measured. This pipe 34 opens out into a cavity 36 machined in the thickness of top substrate 38 to form a diaphragm 40 which forms the element sensitive to the pressure variations to be measured. Via such a pressure variation, the diaphragm and piezoresistive elements 42 arranged on the outer face of top substrate 38 will be deformed. By deforming, the piezoresistive elements will produce an electrical signal representative of the fluid pressure that will be able to be exploited by an electronic data processing circuit.

According to the present invention, at least one wall 44 is structured by any appropriate technique, such as, preferably, photo-etching or screen printing, for example on bottom substrate 32. Top substrate 38 is then positioned on bottom substrate 32, then a cord of sealing material 46 is introduced into the space defined by said two substrates 32 and 38 and the external face, opposite the inner active volume of pressure sensor 30, of wall 44. The sealing material can be introduced into the free space between the two substrates 32 and 38, either by means of a dispenser, or by dipping one of the edges of pressure sensor 30 into a receptacle filled with sealing material, or via a hole pierced on the outside of the perimeter of wall 44 through one of the two substrates 32 or 38.

Of course, one could also envisage the case in which two walls are structured, for example on bottom substrate 32, extending parallel and at a distance from each other, so as to define a filling channel into which, after the two substrates 32 and 38 have been assembled, the sealing material is introduced via filling hole pierced through one of said two substrates 32 or 38 and communicating with the filling channel.

The present invention advantageously casts off constraints linked to the nature of the substrates usually encountered during the manufacture of micro-systems. Indeed, at the present time, either both substrates are made of the same material, for example silicon, and in this case they are directly welded to each other by a chemical reaction that occurs at a high temperature between the —OH groups present in the primitive oxide layers or obtained by growth which covers said two silicon substrates. Or, one of the substrates is made of silicon and the other is typically made of Pyrex®, and in this case anodic welding has to be used, also called electrostatic welding, which implements temperatures comprised between 180° C. and 350° C. and electrical voltages of the order of 200 to 1,000 volts. However, owing to the present invention, two substrates can be joined independently of their respective natures, insofar as this operation resembles simple adhesion by means of the cord of sealing material. Further, the present invention can be implemented without the addition of heat or the application of an electrical voltage, which leaves great freedom of choice for the materials to be deposited on the substrates. Conversely, welding two substrates, for example made of silicon, implements welding temperatures of up to 1,000° C. In that case, the materials chosen to be deposited on the substrates must be able to resist such temperatures. Despite the care taken to choose such materials, it is not rare for the thin layers to oxidize or for the membranes machined in the volume of one of the substrates to deflect and adhere to the other substrate.

The present invention also allows the steps of micromachining in the volume of the substrates to be replaced by surface micromachining steps. Indeed, owing to the present invention, the various channels do not necessarily have to be arranged in the thickness of the substrates, but only in the hermetic volume separating said two substrates and defined by walls.

FIGS. 5 and 6 are views, respectively cross-sectional and top views, of a pump type micro-system. Designated as a whole by the reference numeral 48, this micropump has the peculiarity of not including any valves. It is made up of a bottom substrate 50 in which a fluid feed pipe 52 and evacuation pipe 54 are arranged. An actuating chamber 58, whose volume, which is capable of varying, is controlled for example by a piezoresistive element 60, is arranged in top substrate 56. As can be seen in FIG. 6, actuating chamber 58 communicates with feed and evacuation pipes 52 and 54 via two necks, respectively 62 and 64. Thus, when, for example, actuating chamber 58 decreases in volume, the ejected fluid leaves more easily through evacuation pipe 54 than through feed pipe 52, because of a higher fluidic resistance on the side of said feed pipe 52.

In accordance with the invention, a wall 66 is arranged, for example on bottom substrate 50, preferably but not exclusively by photolithography. This wall 66 defines cavities 68 and 70, which connect feed and evacuation pipes 52 and 54 with actuating chamber. As in the example described in conjunction with FIG. 4, the space left vacant between the two substrates 50 and 56 and the outer face of wall 66, which is not in contact with the fluid, is filled by a cord of sealing material 72. Of course, just as previously mentioned, one could also envisage structuring two walls extending parallel and at a distance from each other on the surface of one of the two substrates. These two walls would thus define a filling channel which would be filled with sealing material via a filling hole through one of said substrates.

It goes without saying that the present invention is not limited to the embodiments that have just been described, and that various simple alterations and variants can be envisaged without departing from the scope of the present invention. In particular, the invention applies in an identical manner to a cell including more than two substrates, for example four, the substrates being joined in pairs by a sealing frame according to the invention and formed of at least one wall that defines the volume for retaining the sensitive material or fluid as well as a cord of sealing material which fills the gap between the two substrates concerned.

Likewise, the present invention applies in a similar manner to a large-scale manufacturing method for cells as shown in FIG. 7. Such a batch of cells includes two plates 74 and 76 common to all of cells 2 and a network of sealed walls 10 and 12 defining, for each cell 2, a cavity 8 for enclosing the liquid crystals as well as the filling channels 20 which are to be filled with a sealing material to connect the two plates 74 and 76 and form the sealing frames for said cells 2. Advantageously, a first plurality of holes 16 for filling cavities 8 with liquid crystal, and a second plurality of holes 18 for supplying the sealing material are made in upper plate 74. Owing to this feature, it is possible to fill filling channels 20, not through the side, for example of liquid crystal cells, but from the top of the latter. One can thus work with a complete batch of cells, without being obliged to divide the batch into strips to be able to have access to the filling holes that are usually arranged on one of the sides of the cells. The cells can thus be practically finished in batches prior to cutting. In particular, the feed holes can be filled and sealed with the sealing material for forming the sealing frames of the cells for the entire batch, thus in a simpler and more economical manner than with individual cells. Likewise, cells 2 can be filled with liquid crystal and filling holes 16 blocked while the cells are still in batches.

According to a variant shown in FIG. 8, a filling channel 20 can be common to two or several cells 2. When the cells are separated, the saw line, shown in dotted lines in the drawing, will pass substantially in the middle of each of the side of the filing channel.

The invention claimed is:

1. A method of manufacturing at least one device defining a volume for retaining a fluid or a sensitive material that is capable of changing its physical properties, particularly its optical properties, via the application of a voltage, or its electrical properties via stress or radiation, said device including at least a first front substrate and at least a second back substrate maintained at a constant distance from each other, these two substrates being joined by a sealing joint which defines the volume for retaining the sensitive medium or fluid,
   wherein said method includes the following steps in the sequence set forth:
   structuring on one of the substrates, at least one filling channel defined by an inner wall and an outer wall, which extend at a distance from each other, the inner wall defining via its inner lateral face the volume for retaining the sensitive medium or fluid, wherein the outer wall surrounds the inner wall;
   joining the second substrate to the first substrate;
   introducing a sealing material capable of flowing into the filling channel until the entire volume of said filling channel is occupied, and
   solidifying the sealing material so that the latter forms the sealing joint.

2. The method according to claim 1, wherein a batch of devices is made including two plates common to all of the devices and a network of sealed walls defining, for each device, a volume for retaining the sensitive medium or fluid as well as the filling channels which are to be filled with a sealing material to connect the two plates and to form the sealing joints of said devices.

3. The method according to claim 2, wherein a first plurality of holes for filling the volumes with the fluid or sensitive material, and a second plurality of holes for feeding the sealing material, are made in one of the plates.

4. The method according to claim 2, wherein one filling channel is shared by at least two adjacent devices.

5. The method according to claim 3, wherein one filling channel is shared by at least two adjacent devices.

6. The method according to claim 1, wherein the sealing material penetrates the filling channels by capillary action.

7. The method according to claim 6, wherein it includes the additional steps of:

creating a vacuum in the filling channel;

causing the sealing material to enter said filling channel, and re-establishing the pressure outside the cell such that, via the pressure difference between the filling channel in which the vacuum prevails and the ambient pressure, the sealing material is driven to the bottom of the filling channel.

8. The method according to claim 1, wherein a layer of photoresist material, which will subsequently be structured by photo-etching techniques to give it the shape of the walls, is deposited on one of the substrates.

9. The method according to claim 8, wherein the photoresist layer is structured so as to form, not only the walls, but also spacer structures for maintaining a constant distance between the two substrates of the cell.

10. The method according to claim 1, wherein the walls are structured by a selective technique for depositing the sealing material.

11. The method according to claim 10, wherein the walls are structured by screen printing.

12. The method according to claim 10, wherein the walls are structured by means of a syringe type dispenser.

13. The method according to claim 1, wherein the sealing material is selected from the group formed by resins that can be polymerized by sensitization using a light or by heating by raising the temperature of the ambient medium, by cyanoacrylate adhesives, by thermoplastic resins and by dual component adhesives whose components harden over time or via a rise in temperature when they are placed in each other's presence.

\* \* \* \* \*

UNITED STATES PATENT AND TRADEMARK OFFICE
CERTIFICATE OF CORRECTION

PATENT NO. : 7,420,648 B2 Page 1 of 1
APPLICATION NO. : 10/518500
DATED : September 2, 2008
INVENTOR(S) : Gilles Rey-Mermet It is certified that error appears in the above-identified patent and that said Letters Patent is hereby corrected as shown below:

On the Title Page item 73, the assignee should read: --Asulab S.A., Marin (CH)--

Signed and Sealed this

Eleventh Day of November, 2008

JON W. DUDAS
*Director of the United States Patent and Trademark Office*